(12) United States Patent
Beylor et al.

(10) Patent No.: US 7,915,970 B1
(45) Date of Patent: Mar. 29, 2011

(54) BI-PHASE MODULATOR APPARATUS AND METHOD

(75) Inventors: Michael R. Beylor, Tucson, AZ (US); Jose O. Urcadez, Tucson, AZ (US); Doug R. Baker, Tucson, AZ (US); Krista L. Lange, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 29 days.

(21) Appl. No.: 12/556,612

(22) Filed: Sep. 10, 2009

(51) Int. Cl.
*H04L 27/20* (2006.01)

(52) U.S. Cl. .......................................... 332/103; 375/282

(58) Field of Classification Search .......... 332/103–105; 375/279, 282, 308

See application file for complete search history.

(56) References Cited

U.S. PATENT DOCUMENTS 4,562,415 A * 12/1985 McBiles ........................ 332/104
2008/0291973 A1 * 11/2008 Azakkour et al. ............. 375/130

* cited by examiner

*Primary Examiner* — David Mis
(74) *Attorney, Agent, or Firm* — Renner, Otto, Boisselle & Sklar, LLP

(57) ABSTRACT

A bi-phase modulator including a driver and a mixer. The driver includes a prescaler having an input for receiving a signal and an output for outputting a baseband signal. The mixer includes a mixer having an input coupled to the output of the prescaler for receiving the baseband signal output by the prescaler. The baseband signal output by the prescaler drives the mixer so as to output a modulated waveform from an output of the mixer.

20 Claims, 4 Drawing Sheets

BI-PHASE MODULATOR APPARATUS AND METHOD

TECHNICAL FIELD

The present disclosure generally relates to a bi-phase modulator device and a method of driving a bi-phase modulator.

BACKGROUND

Modulators are devices that convey data by changing an aspect of a carrier signal in response to a baseband signal. Generally, the baseband signal is representative of the data to be conveyed. Once the carrier signal is modulated using the baseband signal and transmitted over a medium to a receiver, a demodulator demodulates the carrier signal and ultimately recovers the original data.

Phase modulation is a commonly used modulation technique. Phase modulation involves varying the phase of the baseband signal to represent the data to be conveyed. There are generally two types of phase modulation: analog and digital. Analog phase modulation involves the use of a continuously variable baseband signal that modulates the phase of a carrier signal. Digital phase modulation involves the use of a baseband signal containing distinct levels that modulates a carrier signal. One form of digital phase modulation is binary phase or "bi-phase" modulation, wherein the binary baseband signal comprises two phases, generally separated by 180 degrees. The phases represent the data to be transferred in the form of a sequence of 1 bits and 0 bits. For example, the phase shift could be 0 degrees for encoding a "0", and 180 degrees for encoding a "1." Similarly, the phase shift could be −90 degrees for encoding a "0", and +90 degrees for encoding a "1." The baseband signal may then be mixed with the carrier signal to generate a bi-phase modulated output, wherein the carrier signal "carries" the baseband signal to a demodulating device for demodulation.

The baseband signal used in a bi-phase modulators is typically generated by a driver. A driver may be capable of generating a baseband signal based on logic types such as low voltage differential signaling (LVDS), emitter coupled logic (ECL), low voltage positive emitter coupled logic (LVPECL), positive emitter coupled logic (PECL), etc., for example.

Various conventional ECL, PECL, LVPECL, and LVDS driver designs include the use of amplifiers, switches, and/or transistors. Typically, these conventional drivers are capable of providing a baseband signal having a frequency of 50 MHz to 100 MHz and a swing of 600 mV to 800 mV. Many conventional drivers are further characterized as producing a baseband signal that is return-to-zero. A return-to-zero signal is a signal that drops to zero between each bit. The zero between each bit is a neutral or rest condition, and is typically halfway between, for example, the phase shift for encoding a 1 bit and the phase shift for encoding a 0 bit. When described in the context of a phase modulation baseband signal, zero phase shift occurs during the rest condition.

Furthermore, many of these conventional bi-phase modulator driver designs are AC coupled. As a consequence, the output of the modulator driver will decay unless continually modulated at a sufficient modulation rate. The modulation rate in this context is dependent on the AC capacitors used in the modulator driver design.

SUMMARY OF THE INVENTION

The performance of conventional bi-phase modulators is limited by the performance characteristics associated with conventional driver designs. This can be problematic when bi-phase modulation of a carrier signal is desired to be modulated at increased modulation rates, and/or if it is desired to produce a baseband signal that is non-return-to-zero and/or has increased voltage swings.

The present invention provides a device and method for producing a bi-phase modulated baseband signal having significantly higher signal swings than conventional bi-phase modulator designs. The bi-phase modulated baseband signal can also be non-return-to-zero. Additionally, the device and method can modulate a carrier signal at a rate of up to about 12 GHz. Unlike conventional bi-phase modulator designs, the bi-phase modulator driver in accordance with the present invention includes a prescaler to produce the baseband signal for driving the mixer. By floating the power supplies of the of the prescaler and by offsetting the output of the prescaler to match the input of the mixer, the prescaler is used in a novel way to take advantage of its fast switching characteristics and output voltage swing.

In accordance with one aspect of the disclosure, a bi-phase modulator includes a modulator driver including a prescaler having a prescaler input for receiving a signal and a prescaler output for outputting a baseband signal corresponding to the received signal; and a mixer having a mixer input operatively coupled to the prescaler output and a mixer output for outputting a modulated waveform corresponding to the baseband signal.

In accordance with another aspect, the baseband signal output by the prescaler has a voltage swing centered around zero volts.

In accordance with another aspect, the voltage swing of the baseband signal is controlled by an output amplitude control.

In accordance with another aspect, the bi-phase modulator further includes a first power source for supplying a positive voltage, and a second power source for supplying a negative voltage independent of the first power source, wherein the prescaler further includes: a positive prescaler voltage input operatively coupled to the first power source; and a negative prescaler voltage input operatively coupled to the second power source.

In accordance with another aspect, the positive voltage from the first power source is offset from the negative voltage of the second power source.

In accordance with another aspect, the prescaler further comprises a divider select control input for selecting a divider mode applied to the received signal.

In accordance with another aspect, the divider mode is divide by one.

In accordance with another aspect, the prescaler output is a differential output.

In accordance with another aspect, the bi-phase modulator further includes a line receiver having a line receiver input for receiving a data signal to be modulated and a line receiver output for outputting a signal corresponding to the data signal to be modulated, wherein the line receiver output is operatively coupled to the prescaler input.

In accordance with another aspect, the line receiver output is a differential output.

In accordance with another aspect, the mixer input is an intermediate frequency input.

In accordance with another aspect, the mixer further includes a radio frequency input.

In accordance with another aspect of the disclosure, a method of driving a mixer of a bi-phase modulator includes using a prescaler to generate a baseband signal to drive the mixer.

In accordance with another aspect, the method further includes controlling the output amplitude of the prescaler so that the baseband signal has a voltage swing centered around zero volts.

In accordance with another aspect, the method further includes: inputting a negative supply voltage to a negative supply voltage input of the prescaler; and inputting a positive supply voltage to a positive supply voltage input of the prescaler.

In accordance with another aspect, the negative supply voltage and positive supply voltage are offset with respect to each other.

In accordance with another aspect, the method further includes: receiving a signal at an input of the prescaler; and dividing the received signal based on a divider mode of the prescaler.

In accordance with another aspect, the method further includes providing the baseband signal as a differential signal.

In accordance with another aspect, the method further includes using a line receiver to condition signals for the prescaler.

In accordance with another aspect, the method further includes differentially driving at least one of the prescaler or the mixer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION OF THE INVENTION

Figure 1:
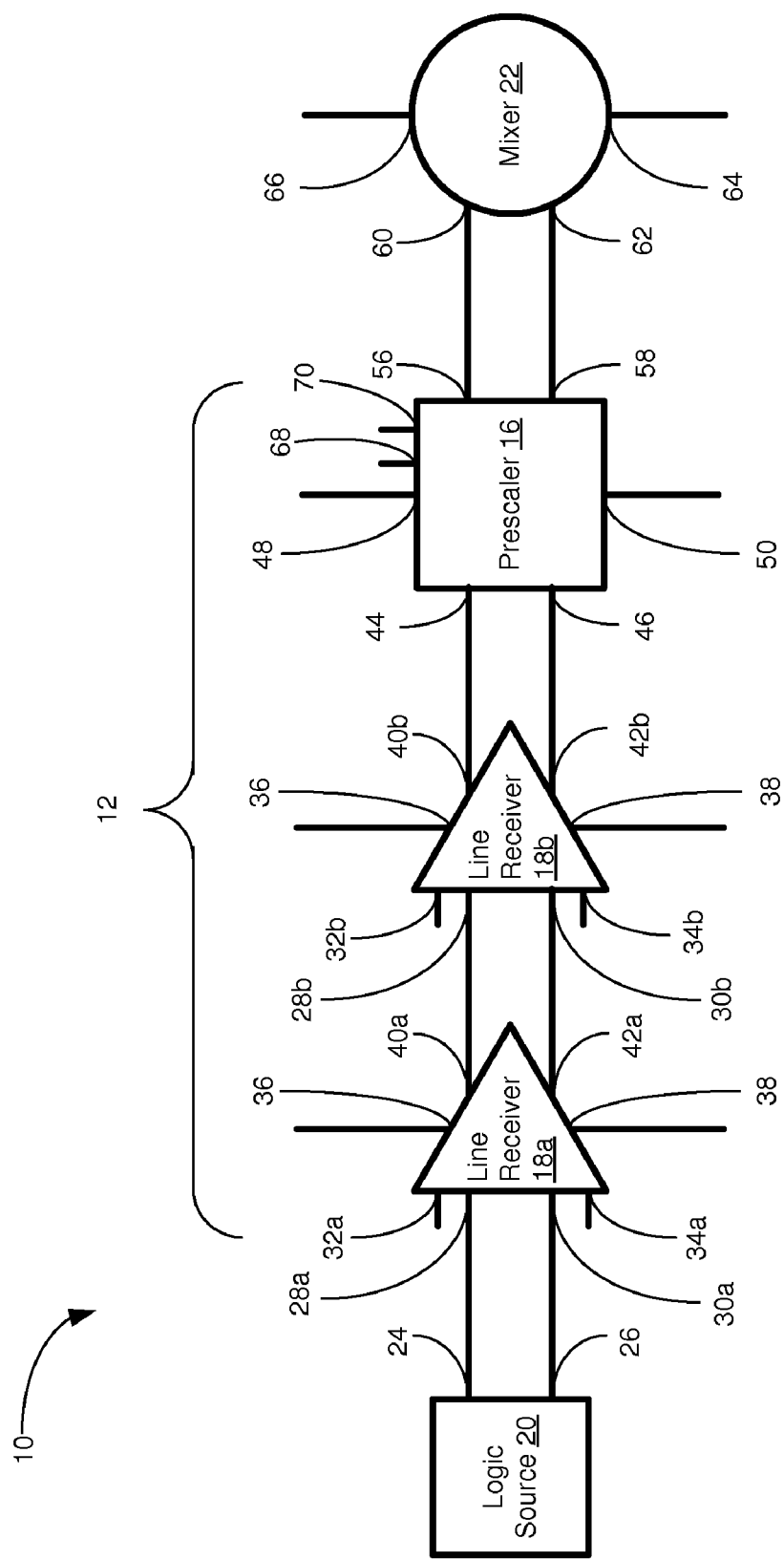
FIG. 1 is a schematic diagram of an exemplary bi-phase modulator in accordance with the present invention.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

A Ka-band bi-phase modulator is presented that includes a driver and a mixer. As noted above, the driver utilizes a prescaler, such as a divide-by-one prescaler in a novel way to produce a baseband signal. As described in more detail below, data that is input to the bi-phase modulator in accordance with the present invention is level-shifted down to the prescaler, which is DC coupled and offset from its conventional power supply. The offset of the baseband signal output is adjusted so that it may be used to drive the intermediate frequency (IF) port of a balanced mixer. The driver in accordance with the present invention is capable of producing a baseband signal having rise and fall times of less than 40 picoseconds, for example, thereby allowing for modulation of a carrier signal around a rate of up to about 12 GHz.

The driver in accordance with the present invention further provides the advantage of producing a non-return-to-zero baseband signal, thereby allowing the baseband signal to maintain a given phase state indefinitely. This provides the advantages of eliminating the use or need of any additional hardware when the baseband signal is not being modulated, as well as not placing any limitation on codes used in concordance with the modulation device. A bi-phase modulator in accordance with the present invention may be useful for radar applications that require this advanced performance, such as, for example, high range resolution missile radars, high range resolution ground based radars, automobile collision avoidance, airport tracking radars, etc.

Turning now to the figures, FIG. 1 is a schematic diagram of an exemplary bi-phase modulator 10 in accordance with the present invention. The bi-phase modulator 10 includes a driver 12 coupled to a mixer 22. The driver 12 includes a prescaler 16, and may additionally include one or more line receivers 18a, 18b. The driver 12 is also coupled to and generates a baseband signal that corresponds to one or more data signals that are received from a logic source 20.

The logic source 20 may include one or more logic source outputs, such as first logic source output 24 and second logic source output 26. The one or more logic source outputs 24, 26 may each output a logic source data signal to the driver 12 of the bi-phase modulator 10. The logic source data that is output from the one or more logic source outputs 24, 26 may be any of a variety of different logic types, such as Emitter Coupled Logic (ECL), Positive Emitter Coupled Logic (PECL), Negative Emitter Coupled Logic (NECL), Low Voltage Positive Emitter Coupled Logic (LVPECL), Low Voltage Differential Signaling (LVDS), etc. The logic source data type may be a binary signal, a unipolar binary signal, a bipolar binary signal, or a differential signal, for example.

The one or more logic source outputs 24, 26 of the logic source 20 may be coupled to a first line receiver 18a. The first line receiver 18a may be a part of the driver 12 of the bi-phase modulator 10 and may perform level shifting on the logic source data for the purpose of converting the logic source data to a signal that is capable of driving the prescaler 16. Level shifting may be performed, for example, by changing the amplitude of the voltage of the logic source data.

The first line receiver 18a is selected such that it operates at a clock frequency of at least 500 MHz so that it can output at least one data signal to drive the prescaler 16. In one embodiment, the first line receiver 18a has an input clock frequency of about 12 GHz, an input data rate of about 12 Gb/s, and/or a rise and fall time of about 30 picoseconds. In another embodiment, the first line receiver 18a outputs a Reduced Swing Emitter Coupled Logic (RSECL) data signal and is a RSECL differential clock driver. An example of a commercially available line receiver suitable for use in the driver 12 of the bi-phase modulator is the NBSG11 differential clock driver, available from ON Semiconductor, 5005 East McDowell Road, Phoenix, Ariz., 85008, USA.

Figure 2:
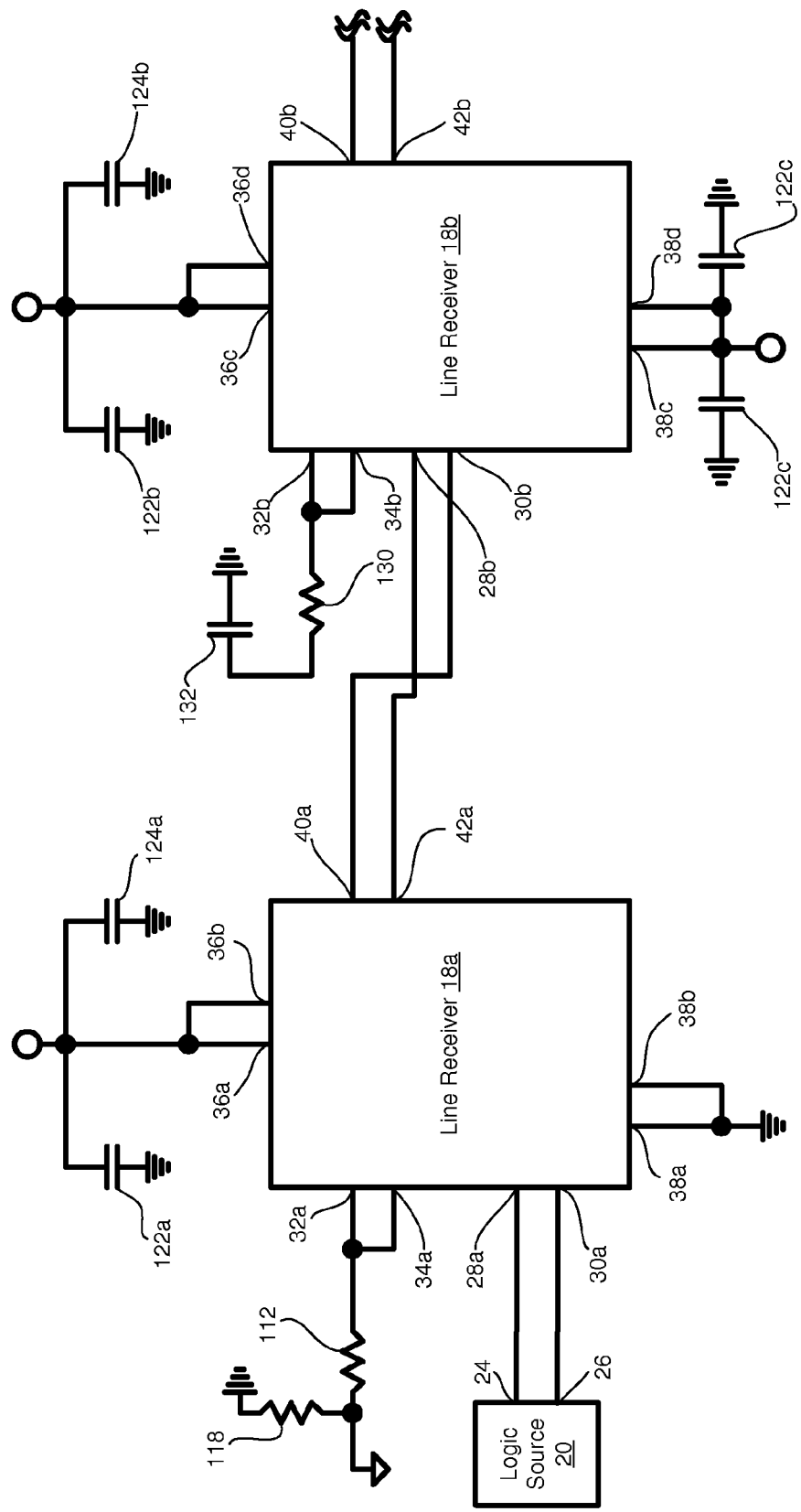
FIG. 2 is a schematic diagram of an exemplary first and second line receiver that may be used in the bi-phase modulator in accordance with the present invention.

An exemplary first line receiver 18a in accordance with the present invention is illustrated in FIGS. 1 and 2. The first line receiver 18a may include one or more data inputs, such as first logic input 28a and second logic input 30a. The one or more logic inputs 28a, 30a may be coupled to respective ones of the one or more logic source outputs 24, 26 of the logic source 20 for receiving the one or more logic source data signals. In one embodiment, the first logic input 28a is an inverted differential input, and the second logic input 30a is a non-inverted differential input.

The first line receiver 18a may include one or more termination pins, such as first termination pin 32a and second termination pin 34a, to aid in interfacing the first line receiver 18a with the logic source 20. For example, the one or more termination pins 32a, 34a may be coupled differently depending on the type of logic source data received by the one or more logic inputs 28a, 30a from the logic source 20. More particularly, when LVDS is the type of data signal received from the logic source 20, the first termination pin 32a and the second termination pin 34a may be coupled together. When the type of data signal received is one of PECL, LVPECL, NECL or RSECL, the first termination pin 32a and the second termination pin 34a may be coupled using standard ECL termination techniques.

FIG. 2 provides an example of one manner in which the termination pins 32a and 34a may be coupled together for receiving a LVDS type of data signal. As illustrated, first termination pin 32a and second termination pin 34a are coupled to a first end of a resistor 112. A second end of resistor 112 is coupled to ground and to a first end of resistor 118, respectively. A second end of resistor 118 is coupled to ground.

The first line receiver 18a may include one or more first voltage inputs 36, such as first voltage input 36a and first voltage input 36b. The one or more first voltage inputs 36a, 36b may each be coupled to a power source (not shown) for inputting one or more voltages to the first line receiver 18a. In one embodiment, the one or more first voltage inputs 36a, 36b are coupled to a power source for inputting a positive voltage to the first line receiver 18a. The amount of voltage supplied to the first voltage inputs 36a, 36b may be any suitable voltage that is within the operational range of the first line receiver 18a. In one embodiment, the first voltage inputs 36a, 36b receive a positive 2.3 volts.

FIG. 2 also provides an example of one manner in which a power source may be coupled to the first voltage inputs 36a, 36b. As illustrated, the power source is coupled to first voltage inputs 36a and 36b and a first end of each of two capacitors 122a, 124a, respectively. A second end of each capacitor 122a, 124a is respectively coupled to ground.

The first line receiver 18a may include one or more second voltage inputs 38, such as second voltage input 38a and second voltage input 38b. The one or more second voltage inputs 38a, 38b may each be coupled to a power source (not shown) for inputting one or more voltages to the first line receiver 18a, or the one or more second voltage inputs 38a, 38b may be coupled to ground. In an embodiment where the one or more second voltage inputs 38a, 38b are coupled to a power source, a negative voltage may be supplied to the first line receiver 18a. The power source may be coupled to the second voltage inputs 38a, 38b in a manner similar to how the first voltage inputs 36a, 36b are coupled to a power source, as described above. The amount of voltage supplied to the second voltage inputs 38a, 38b may be any suitable voltage that is within the operational range of the first line receiver 18a. In an embodiment where the second voltage inputs 38a, 38b are coupled to ground, the second voltage inputs 38a, 38b may be coupled in a manner as illustrated in FIG. 2

The first line receiver 18a may include one or more outputs, such as first output 40a and second output 42a. The one or more outputs 40a, 42a may each output a data signal from the first line receiver 18a. The one or more data signals output by each of the one or more outputs 40a, 42a may be a binary signal, a unipolar binary signal, a bipolar binary signal, a differential signal, an inverted differential signal, a non-inverted differential signal, or RSECL data signal, for example.

The data signal output by the first line receiver 18a corresponds to the data signal received from the logic source 20. Based on the logic source data signal input to the line receiver 18a, the data outputs 40a, 42a of the first line receiver 18a may output a level-shifted differential signal. The amount that the line receiver level-shifts the data signal depends on such factors as, for example, the respective voltages input at the one or more first voltage inputs 36a, 36b and the one or more second voltage inputs 38a, 38b.

As illustrated in FIGS. 1 and 2, the driver 12 of the bi-phase modulator may include a second line receiver 18b. In such an embodiment, the second line receiver 18b may input the data signal that has been output from the data outputs 40a, 42a of the first line receiver 18a, and may also perform level-shifting on the data signal in a manner that is similar to that of the first line receiver 18a. The second line receiver 18b may include similar features and/or similar attributes as the first line receiver 18a. Therefore, for the sake of brevity, similar features described in detail with respect to the first line receiver 18a will not be discussed in detail when the feature or a similar feature is present in the subsequently described second line receiver 18b.

The one or more inputs 28b, 30b of the second line receiver 18b may be coupled to respective ones of the one or more outputs 40a, 42a of the first line receiver 18a for receiving the data signal output by the first line receiver 18a. As illustrated in FIG. 1, output 40a of the first line receiver 18a may be coupled to input 28b of the second line receiver 18b, and output 42a of the first line receiver 18a may be coupled to input 30b of the second line receiver 18b. However, as illustrated in FIG. 2, the one or more outputs of the first line receiver 18a may be reverse coupled to the inputs of the second line receiver 18b. More particularly, output 40a of the first line receiver 18a may be coupled to input 30b of the second line receiver 18b, and output 42a of the first line receiver 18a may coupled to input 28b of the second line receiver 18b. Reverse coupling may be performed to avoid exceeding the input voltage limits of the succeeding line receiver (e.g., second line receiver), as well as to simplify the printed wiring board.

FIG. 2 further illustrates an example of one manner in which the termination pins of the second line receiver may be coupled using standard ECL termination techniques. First termination pin 32b and second termination pin 34b are coupled to a first end of a resistor 130. A second end of resistor 130 is coupled to a first end of a capacitor 132, and a second end of capacitor 132 is coupled to ground.

As illustrated in FIG. 2, each of the first voltage inputs 36c, 36d and the second voltage inputs 38c, 38d are coupled to a respective power source in a similar manner to that described above with respect to the first voltage inputs 36a and 36b of the first line receiver 18a. As illustrated, a power source is coupled to first voltage inputs 36c and 36d and a first end of each of two capacitors 122b, 124b, respectively. A second end of each capacitor 122b, 124b is respectively coupled to ground. Similarly, a power source is coupled to second voltage inputs 38c and 38d and a first end of each of two capacitors 122c, 124c, respectively. A second end of each capacitor 122c, 124c is respectively coupled to ground. However, it is to be understood that the first voltage inputs 36c, 36d and the second voltage inputs 38c, 38d of the second line receiver 18b may be coupled to a respective power source in a manner than is different than that utilized by the first voltage inputs 36a, 36b of the first line receiver 18a.

With continued reference to FIG. 1, the outputs 40b, 42b of the second line receiver are coupled to the prescaler 16 for inputting the level shifted data signal. However, the outputs 40b, 42b may be coupled to a third line receiver (not shown) for purposes of performing subsequent level shifting of the data signal. As discussed above, the one or more line receivers perform level shifting on the logic source data for the purpose of converting the logic source data to a signal that is capable of driving the prescaler 16. Therefore, although FIGS. 1 and 2 illustrate the driver 12 of the bi-phase modulator 10 as including two line receivers 18a, 18b coupled in series, the driver 12 may include any suitable number of line receivers to perform the appropriate level shifting of the logic source data. Accordingly, if the data signal output from a line receiver is capable of driving the prescaler 16, the outputs of that line receiver may be coupled to the prescaler 16. Of course, if no level shifting of the logic source data is needed for the data signal to drive the prescaler 16, the driver 12 may include no line receivers.

Hence, in one embodiment, the driver 12 of the bi-phase modulator 10 may include more than two line receivers, for example, three, four, etc., coupled in series. That is, the one or more outputs of an upstream line receiver may be coupled to respective ones of the one or more inputs of a downstream line receiver in a manner similar to that described above with respect to the coupling between the first line receiver 18a and second line receiver 18b. The one or more outputs of the last line receiver in the series of line receivers may be coupled to the prescaler 16.

In another embodiment, the driver 12 of the bi-phase modulator 10 may include only one line receiver (e.g., the first line receiver 18a). In such an embodiment, the one or more outputs from the first line receiver may be coupled to the prescaler 16.

In yet another embodiment, the driver 12 of the bi-phase modulator 10 may include zero line receivers, and the first and second logic source outputs 24, 26 may be coupled to the prescaler.

As used herein, a prescaler is defined as an electronic counting circuit for purposes of reducing a high frequency signal to a lower frequency signal by integer division. Conventionally, prescalers are used to extend the upper frequency range of, for example, frequency counters, phase locked loop synthesizers, and other counting circuits. However, as described herein, the prescaler is used in a novel manner for purposes of driving a bi-phase modulator 10.

The prescaler outputs a baseband signal for purposes of driving the mixer 22 of the bi-phase modulator 10 of the present invention. More particularly, the prescaler 16 receives one or more data signals from a line receiver (e.g., the second line receiver 18b) and outputs one or more data signals to the mixer 22 of the bi-phase modulator 10. The prescaler 16 is used in order to drive the intermediate frequency (IF) port of the mixer 22 with sufficient amplitude in order to provide a modulated waveform. The prescaler 16 may be any suitable prescaler capable of producing an output signal having an operating range and output swing suitable for use as a baseband signal. In one embodiment, the operating range of the prescaler is from DC-20 GHz. In one embodiment, the output swing of the prescaler is 750 mV ppk/side. An example of a commercially available prescaler suitable for use in the modulator driver portion of the bi-phase modulator is the UXD20P DC-20 GHz Programmable 1,2,3,8 Binary Prescaler, available from Centellax, 3843 Brickway Blvd., Suite 100, Santa Rosa, Calif. 95403, USA.

The prescaler 16 may include one or more data inputs, such as first data input 44 and second data input 46. Each of the one or more data inputs 44, 46 may be coupled to respective ones of the one or more outputs of an upstream line receiver and may receive one or more data signals from an upstream line receiver. As described above, the one or more data signals from the upstream line receiver may be a binary signal, a unipolar binary signal, a bipolar binary signal, a differential signal, an inverted differential signal, a non-inverted differential signal, or RSECL data signal, for example.

Figure 3:
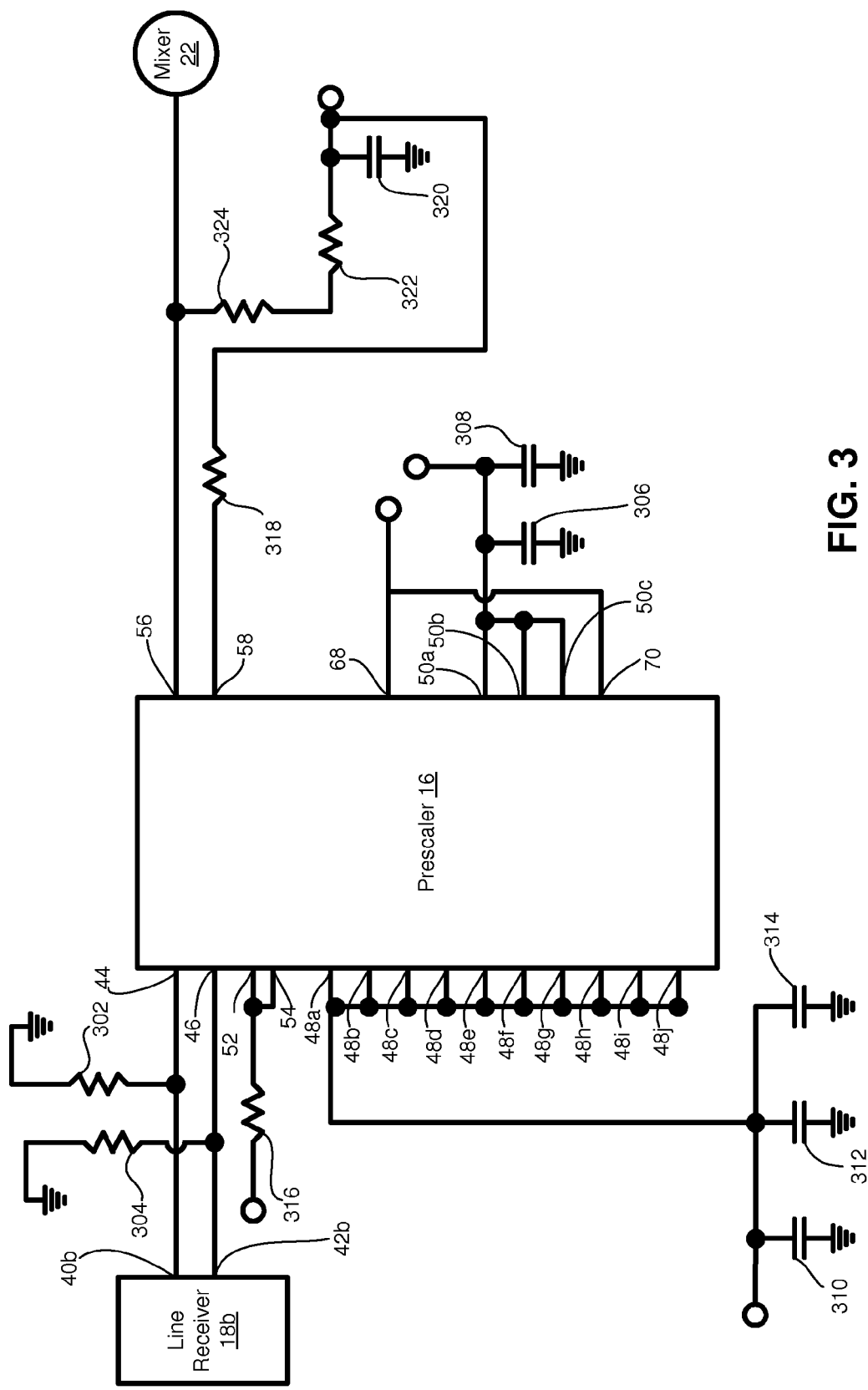
FIG. 3 is a schematic diagram of an exemplary prescaler that may be used in the bi-phase modulator in accordance with the present invention.

FIG. 1 illustrates an embodiment wherein the one or more data inputs 44, 46 of the prescaler may be coupled to respective ones of the one or more outputs 40b, 42b of the second line receiver. FIG. 3 further illustrates that the first data input 44 of the prescaler may be coupled to the output 40b of the second line receiver 18b and a first end of a resistor 302. Similarly, the second data input 46 of the prescaler is coupled to the output 42b of the second line receiver 18b and a first end of a resistor 304. A respective second end of each of the resistors 306, 308 may be coupled to ground.

The prescaler 16 may be DC coupled to one or more power sources. More particularly, the prescaler 16 may include one or more first voltage inputs 48, such as first voltage inputs 48a-j. The one or more first voltage inputs 48a-j may be coupled to a voltage source for inputting a positive power voltage to the prescaler 16. The amount of voltage supplied to the respective first supply voltage input 48a-j may be any suitable voltage that is within the operational range of the prescaler 16. In one embodiment, a positive 1.0 volts is supplied to the first supply voltage inputs 48a-j.

FIG. 3 illustrates one manner in which the first voltage inputs 48a-j of the prescaler 16 may be coupled to a power source. As illustrated, the power source is coupled to first voltage inputs 48a-j and a first end of each of three capacitors 310, 312, 314, respectively. A second end of each capacitor 310, 312, 314 is respectively coupled to ground.

The prescaler 16 may further include one or more second voltage inputs 50, such as second voltage inputs 50a-c. The one or more second voltage inputs 50a-c may be coupled to a power source for inputting a negative power voltage to the prescaler 16. The amount of voltage supplied to the respective second supply voltage input 50a-c may be any suitable voltage that is within the operational range of the prescaler 16. In one embodiment, a negative 2.3 volts is supplied to the second supply voltage inputs 50a-c.

FIG. 3 illustrates one manner in which the second voltage inputs 50a-c of the prescaler 16 may be coupled to a power source. As illustrated, the power source is coupled to second voltage inputs 50a-c and a first end of each of two capacitors 306, 308, respectively. A second end of each capacitor 306, 308 is respectively coupled to ground.

As stated above, the prescaler 16 may be DC coupled to both a positive power source and a negative power source. Because of this, the power supply to the prescaler 16 may be offset from a conventional means of supplying power to the prescaler 16 (e.g., negative supply DC coupling) wherein, for example, one voltage supply (e.g., first voltage supply 48a-c) is coupled to ground and the other voltage supply (e.g., second voltage supply 50a-j) is coupled to a negative power source. For example, in one embodiment, a positive 1.0 volts is supplied to the first voltage supply 48a-c and a negative 2.3 volts is supplied to the second voltage supply 50a-j, and the power supply may be considered to be offset by 1.0 volts. Offsetting the power supply in the above-described manner may also be described as floating the power supplies.

The prescaler 16 may include one or more divider select control inputs, such as first divider select control input 52 and second divider select control input 54. The one or more divider select control inputs 52, 54 are used in controlling the scaling applied to the one or more data signals received by the one or more inputs 48, 50 of the prescaler 16. The one or more divider select control inputs 52, 54 may be compatible with any suitable signaling level, such as, for example, CMOS, LVTTL, etc. Scaling may be performed, for example, by dividing the magnitude of the one or more inputs by a predetermined value, which may be performed by executable logic within the prescaler 16. The prescaler 16 may be capable of dividing the magnitude of the input by any suitable factor depending on the state of the one or more divider select control inputs 52, 54. For example, each divider select control input 52, 54 may be selectably set to a 1 or a 0 state. In one embodiment, when both the first and second divider select control inputs 52, 54 are set to a 0 state, the prescaler 16 may divide the magnitude of the input by a factor of one. In another embodiment, when the first divider select control unit 52 is set to a 1 state and the second divider select control unit 54 is set to a 0 state, the prescaler 16 may divide the magnitude of the input by a factor of eight. In another embodiment, when the first divider select control unit 52 is set to a 0 state and the second divider select control unit 54 is set to a 1 state, the prescaler 16 may divide the magnitude of the input by a factor of four. In another embodiment, when both the first and second divider select control inputs 52, 54 are set to a 1 state, the prescaler 16 may divide the magnitude of the input by a factor of two.

FIG. 3 illustrates an example of one manner in which the divider select control inputs 52, 54 may be coupled to a power source for setting each of the first and second divider select control inputs 52, 54 to a zero state so as to set the prescaler 16 to a divide by one mode. More specifically, a power source is coupled to a first end of resistor 316. A second end of resistor 316 is coupled to each of divider select control inputs 52, 54. In one embodiment, the power source coupled to the divider select control inputs 52, 54 supplies negative 2.3 volts.

The prescaler 16 may include an output amplitude control 68 for varying the amplitude of the output of the prescaler 16. The output amplitude control 68 allows for the adjustment of the offset of the baseband signal that is output from the prescaler 16 so that the amplitude of the first output 52 is complementary of the amplitude of the second output 60. For example, if the amplitude of the first output is positive 0.5 volts, the complementary amplitude output by the second output is negative 0.5 volts. When such a condition is achieved, the baseband signal may be characterized as swinging equally around ground (i.e., zero volts). Because the circuit (e.g. line receiver 18a, line receiver 18b, prescaler 16, mixer 22) is dc-coupled, it allows for a non-return-to-zero modulator. Swinging around zero volts is only required if one IF port is available on the mixer. As described above, a non-return-to-zero signal does not return to a rest state between each pulse. Accordingly, the bi-phase modulator in accordance with the present invention may possess the ability to maintain a given phase state indefinitely.

FIG. 3 illustrates that the output amplitude control 68 may be coupled to a variable power source (not shown) for purposes of varying the offset of the baseband signal output by the prescaler 16. In one embodiment, the power source coupled to the output amplitude control 68 is adjustable between zero volts and positive 1.0 volts. As illustrated, the power source may also be coupled to a temperature diode input 70.

The prescaler 16 may include one or more outputs, such as first output 56 and second output 58. The one or more outputs 56, 58 output one or more data signals to the mixer 22 of the bi-phase modulator 10. The one or more data signals output by the prescaler 16 may be referred to as a baseband signal.

As used herein, a mixer 12 acts as a phase inverting switch to the RF signal controlled by the prescaler 16 or 56, 58. For example, for purposes of this application, the mixer 22 combines the baseband signal with a carrier signal.

The baseband signal that is output from the one or more outputs 56, 58 of the prescaler 16 may be used to drive the mixer 22 differentially or in a single-ended manner. FIG. 1 illustrates an embodiment of the bi-phase modulator 10 wherein the first output 56 of the prescaler 16 is coupled to the first input 60 of the mixer 22, and the second output 58 of the prescaler 16 is coupled to the second input 62 of the mixer 22. In such an embodiment, the mixer 22 may be driven differentially.

Alternatively, FIG. 3 represents another embodiment in which the mixer 22 may be driven in a single-ended manner. That is, first output 56 is coupled to the first input 60 of the mixer 22. The second output 58 is coupled to a first end of a resistor 318. A second end of resistor 318 is coupled to a power source (not shown), a first end of a capacitor 320, and a first end of a resistor 322, respectively. A second end of capacitor 320 is coupled to ground, and a second end of resistor 322 is coupled to a first end of a resistor 324. A second end of resistor 324 is coupled with the first output 58 of the prescaler 16 to the mixer 22. Such a configuration may be utilized for stress derating purposes.

As described above, the use of a suitable prescaler 16 in the driver 12 of the bi-phase modulator 10 allows for the production of a Ka-band bi-phase modulator driver with the ability to produce a baseband signal that may be characterized as swinging equally around zero volts and being non-return-to-zero. The voltage swings of the output of the driver 12 in accordance with the present invention may be at least 1 volt peak-to-peak.

Furthermore, the rise rate and fall rate of the driver 12 of the bi-phase modulator 10 in accordance with the present invention is orders of magnitude faster than conventional bi-phase modulators. In one embodiment, the driver 12 of the bi-phase modulator 10 of the present invention is capable of producing a baseband signal having a rise time and a fall time of less than 100 pico-seconds. In another embodiment, the driver 12 of the bi-phase modulator 10 of the present invention is capable of producing a baseband signal having a rise time and a fall time of less than 50 pico-seconds. In another embodiment, the driver 12 of the bi-phase modulator 10 of the present invention is capable of producing a baseband signal having a rise time and a fall time of less than 40 pico-seconds.

Figure 4:
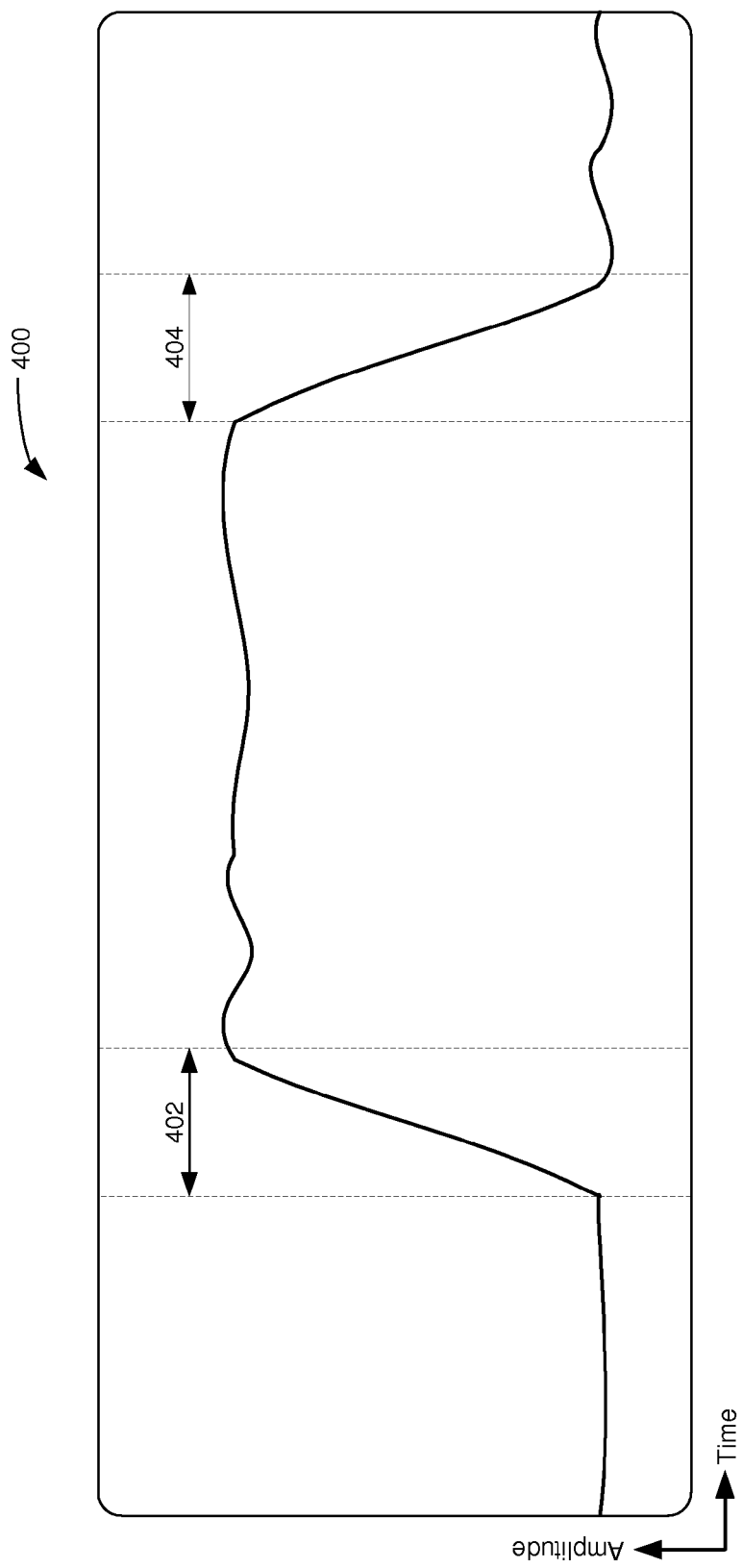
FIG. 4 is a graph illustrating the rise and fall transition times of a baseband signal produced by an exemplary driver in accordance with the present invention.

FIG. 4 illustrates a graph of an exemplary baseband signal output by a driver 12 in accordance with the present invention. Areas 402 and 404 represent the amount of time an exemplary driver 12 had taken to rise from a first state to a second state, and the amount of time to fall from the second state back to the first state. In this exemplary embodiment, the driver 12 achieved a rise time of about 37.6 pico-seconds and a fall time of about 37.1 pico-seconds.

Accordingly, the driver 12 of the bi-phase modulator 10 in accordance with the present invention is capable of producing a baseband signal that is orders of magnitude faster than conventional bi-phase modulators. In one embodiment, the driver 12 has modulation capabilities of at least 1 GHz. In another embodiment, the driver 12 has modulation capabilities of at least 5 GHz. In another embodiment, the driver 12 has modulation capabilities of about 12 GHz.

The mixer 22 of the bi-phase modulator 10 mixes the baseband signal output from the prescaler 16 with a carrier signal to generate a modulated output signal. Preferably, the mixer 22 has sufficient intermediate frequency (IF), radio frequency (RF), and local oscillator (LO) bandwidth so as not to limit the modulation bandwidth produced by the driver 12 of the bi-phase modulator 10. Furthermore, it is preferred that the mixer does not have DC grounds, have a frequency response down to DC, an IF port response greater than 3 GHz, be balanced such that the phase error is less than two degrees from the zero to 180 degree states, and is capable of floating the supplies of the driver 12. An example of a commercially available mixer suitable for use in the bi-phase modulator 10 is the M9-0444, available from Marki Microwave, 215 Vineyard Ct., Morgan Hill, Calif. 95037, USA.

With continued reference to FIG. 1, the mixer includes a radio frequency (RF) input 64 for inputting the carrier signal. The carrier signal may be any suitable carrier signal.

The mixer 22 may include one or more intermediate frequency (IF) inputs, such as a first signal input 60 and a second signal input 62 for receiving the baseband signal output from the prescaler 16. As described above, the baseband signal may be a single-ended signal that is received by, for example, the first signal input 60. The baseband signal may also be a differential signal that is received by the first signal input 60 and the second signal input 62, respectively.

The mixer 22 modulates the carrier signal using the baseband signal so as to produce a modulated signal. In one embodiment, the bi-phase modulator 10 is capable of modulating a carrier signal at a rate of at least 1 GHz. In another embodiment, the bi-phase modulator 10 is capable of modulating a carrier signal at a rate of at least 3 GHz. In another embodiment, the bi-phase modulator 10 is capable of modulating a carrier signal at a rate of at least 5 GHz. In another embodiment, the bi-phase modulator 10 is capable of modulating a carrier signal at a rate of about 12 GHz.

The modulated signal produced by the mixer 22 may be output via output 66 and transmitted to a demodulating device for subsequent demodulation.

Although particular embodiments of the invention have been described in detail, it is understood that the invention is not limited correspondingly in scope, but includes all changes, modifications, and equivalents coming within the spirit and terms of the claims appended hereto.

What is claimed is:

1. A bi-phase modulator, comprising:
   a modulator driver including a prescaler having a prescaler input for receiving a signal and a prescaler output for outputting a baseband signal corresponding to the received signal; and
   a mixer having a mixer input operatively coupled to the prescaler output and a mixer output for outputting a modulated waveform corresponding to the baseband signal.

2. The bi-phase modulator of claim 1, wherein the baseband signal output by the prescaler has a voltage swing centered around zero volts.

3. The bi-phase modulator of claim 2, wherein the voltage swing of the baseband signal is controlled by an output amplitude control.

4. The bi-phase modulator of claim 1, further comprising a first power source for supplying a positive voltage, and a second power source for supplying a negative voltage independent of the first power source, wherein the prescaler further comprises:
   a positive prescaler voltage input operatively coupled to the first power source; and
   a negative prescaler voltage input operatively coupled to the second power source.

5. The bi-phase modulator of claim 4, wherein the positive voltage from the first power source is offset from the negative voltage of the second power source.

6. The bi-phase modulator of claim 1, wherein the prescaler further comprises a divider select control input for selecting a divider mode applied to the received signal.

7. The bi-phase modulator of claim 6, wherein the divider mode is divide by one.

8. The bi-phase modulator of claim 1, wherein the prescaler output is a differential output.

9. The bi-phase modulator of claim 1, further comprising a line receiver having a line receiver input for receiving a data signal to be modulated and a line receiver output for outputting a signal corresponding to the data signal to be modulated, wherein the line receiver output is operatively coupled to the prescaler input.

10. The bi-phase modulator of claim 9, wherein the line receiver output is a differential output.

11. The bi-phase modulator of claim 1, wherein the mixer input is an intermediate frequency input.

12. The bi-phase modulator of claim 1, wherein the mixer further comprises a radio frequency input.

13. A method of driving a mixer of a bi-phase modulator, comprising using a prescaler to generate a baseband signal to drive the mixer.

14. The method of claim 13, further comprising controlling the output amplitude of the prescaler so that the baseband signal has a voltage swing centered around zero volts.

15. The method of claim 13, further comprising:
   inputting a negative supply voltage to a negative supply voltage input of the prescaler; and
   inputting a positive supply voltage to a positive supply voltage input of the prescaler.

16. The method of claim 15, wherein the negative supply voltage and positive supply voltage are offset with respect to each other.

17. The method of claim 13, further comprising:
   receiving a signal at an input of the prescaler; and
   dividing the received signal based on a divider mode of the prescaler.

18. The method of claim 13, further comprising providing the baseband signal as a differential signal.

19. The method of claim 13, further comprising using a line receiver to condition signals for the prescaler.

20. The method of claim 19, further comprising differentially driving at least one of the prescaler or the mixer.

\* \* \* \* \*